INVENTOR.
TOM J. FARROW
BY David T. Dennis &
W. A. Schaich
ATTORNEYS

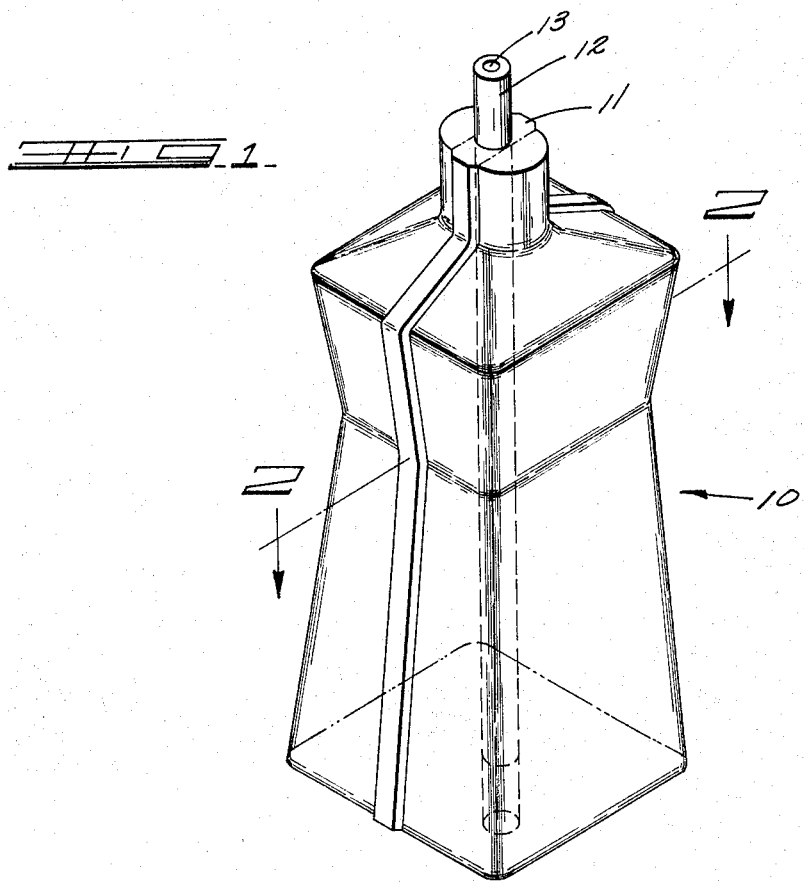
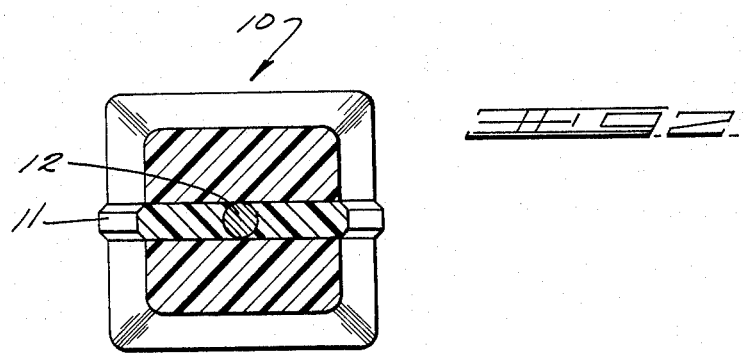

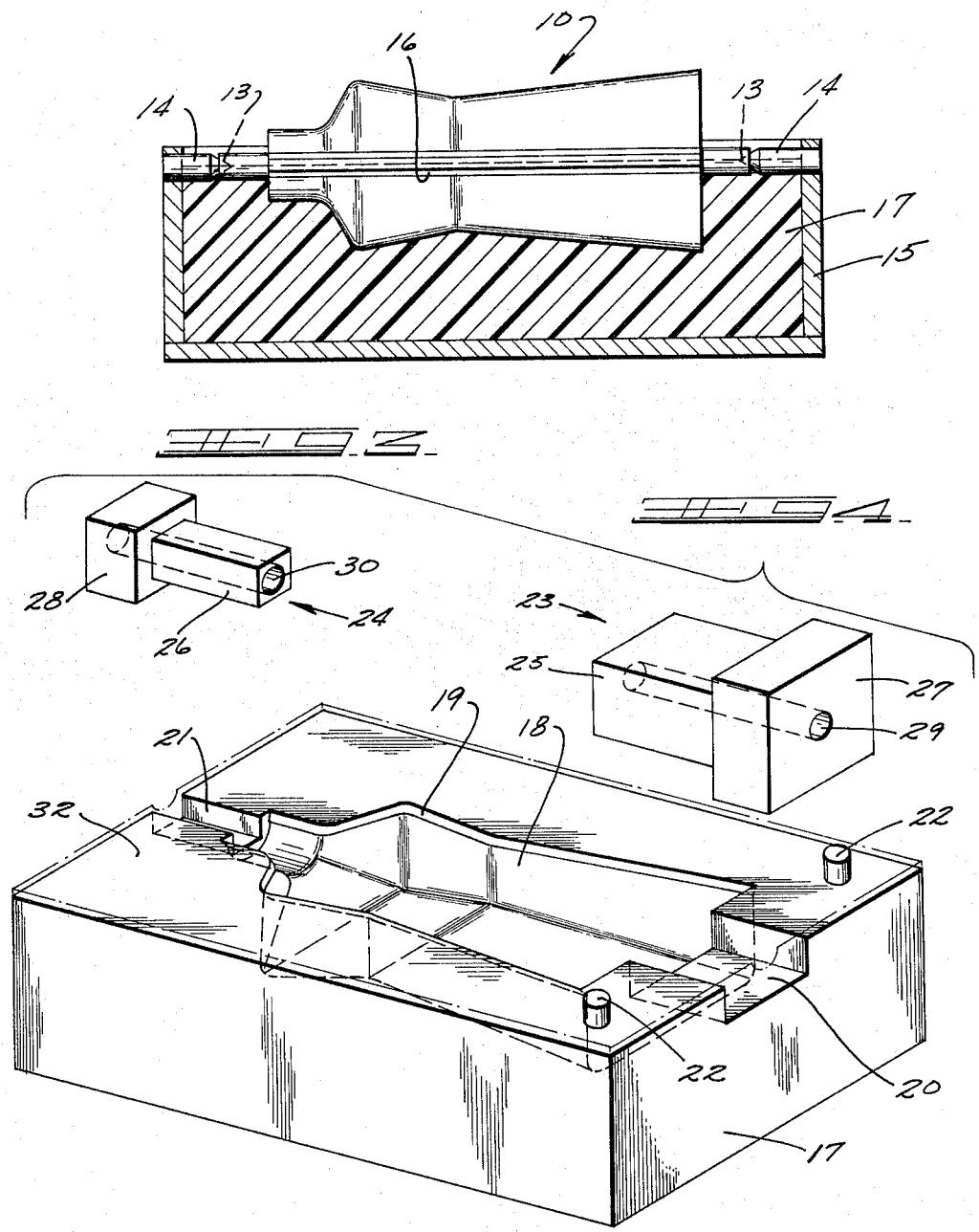

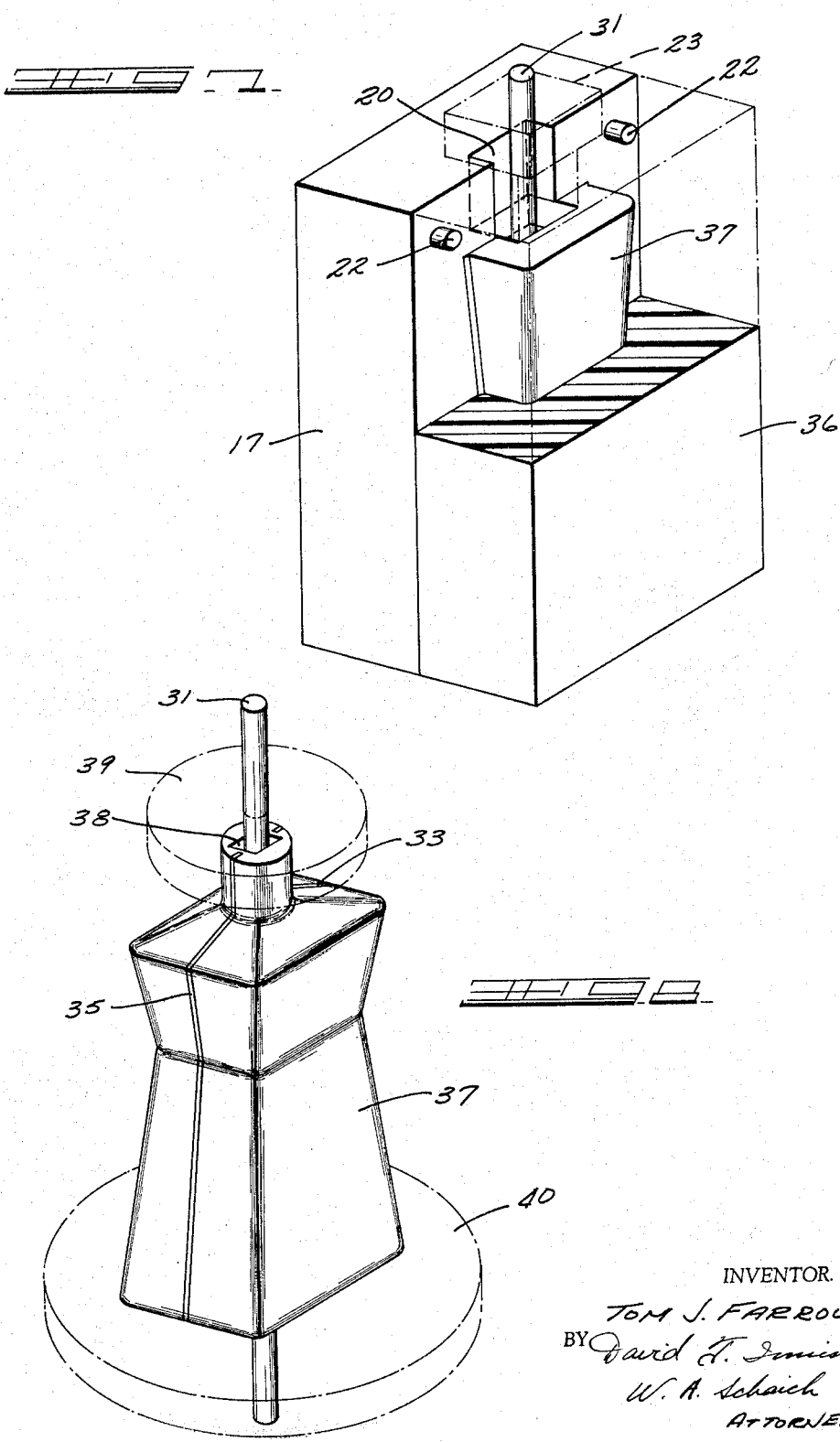

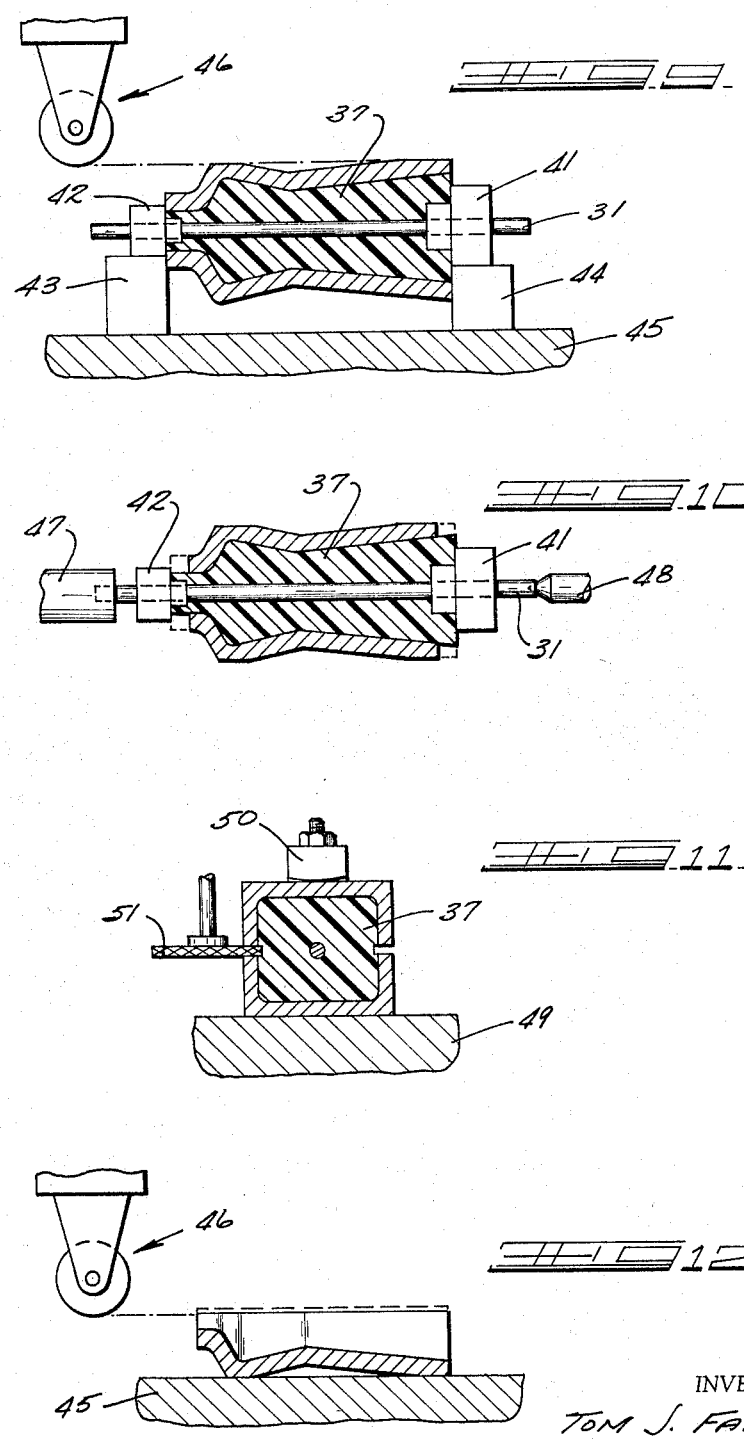

United States Patent Office 3,285,835
Patented Nov. 15, 1966

3,285,835
METHOD AND APPARATUS FOR ELECTROFORM-ING SPLIT GLASSWARE MOLDS
Tom Jay Farrow, Toledo, Ohio, assignor to Owens-Illinois Glass Company, a corporation of Ohio
Filed Apr. 29, 1963, Ser. No. 276,502
13 Claims. (Cl. 204—6)

This invention relates to a process for producing a split, glassware forming mold.

This invention further relates to a mandrel for electroforming glass forming molds.

More particularly, this invention relates to a method of making an epoxy or plastic type mandrel of unique design which, through the process of electroforming thereon, is used to produce a split mold particularly suited for use as a blow mold for blown glass containers.

It has been the practice in the past to make glass forming molds by an electroforming process in which the mandrel is cut or shaped by hand into the exact shape of a bottle which it is desired to produce molds for and to then provide a central conducting member extending through the mandrel which is connected to the silvered surface of the mandrel so as to provide a form upon which, during the electroforming process, metal is deposited. In this process it has been extremely difficult to predict where the parting line of the mold is in relation to the mandrel after the electroforming is completed. Thus, when the time came to slice the electroformed body along the parting line and to machine the backs of the mold halves, extreme caution was necessary in order to insure that the electroformed body was cut in the precise manner so that when the two parts were machined they would, when placed together, form the exact halves of a glassware mold cavity. During the normal electroforming process these mandrels had the unfortunate property of not electroforming precisely evenly throughout the overall surface of the mandrel. Thus, the outer appearance of the fully electroformed body with the enclosed mandrel would not accurately correspond to the precise shape of the mandrel therein.

Because of this lack of conformity of the outside of the electroformed body with the mandrel enclosed therein, it was extremely difficult to determine precisely where to make the cut so as to sever the electroformed body and mandrel into two equal parts along the proposed parting line of the mold halves. Furthermore, it was extremely difficult, if not impossible, to locate these parallel planes or cuts necessary to be put in the back of the mold to provide a squared off or flattened back to the molds.

With the foregoing in view, applicant has determined that if the mandrel for the electroform is made so that current from the support for the mandrel may reach the surface of the mandrel without bridging the ends of the mandrel, locating surfaces may be maintained at the ends of the mandrel. With these locating surfaces maintained free of any electro-deposition, it is possible, after the electroforming process has been completed, to accurately and precisely determine the plane in which the electroform may be cut in half and also the backs of the electroform body may be accurately machined in a plane parallel to the parting line of the molds eventually produced.

To accomplish the foregoing, applicant has invented a new process for making an electroform mandrel in which it is not necessary that current bridge the ends of the mandrel.

With the foregoing in mind it is an object of this invention to provide a method of forming an electroform mandrel.

It is an additional object of this invention to provide an electroform mandrel having superior construction.

It is a still further object of this invention to provide a process for making an electroform mandrel in which the mandrel will have the precise configuration of the article to be produced.

Other and further objects will be apparent from the following description taken in conjunction with the annexed sheets of drawings, wherein:

FIG. 1 is a perspective view of a master from which the electroform mandrel is made;

FIG. 2 is a cross-sectional view taken at lines 2—2 of FIG. 1;

FIG. 3 is a cross-sectional view illustrating the first step in process for making an electroform mandrel, showing the master supported within an epoxy mold half with the epoxy shown in cross-section;

FIG. 4 is a perspective view of the epoxy female mold within which the epoxy mandrel is formed, showing the locating slots at the ends of the mold and the adaptors which fit within the locating slots;

FIG. 7 is a perspective view showing the two epoxy female molds in closed position with the epoxy electroform mandrel enclosed therein;

FIG. 8 is a perspective view of the epoxy electroform mandrel of the invention; and FIGS. 9 to 12 are cross-sectional views illustrating the steps carried out on the electroformed mandrel to transform it into mold halves.

Figure 5:
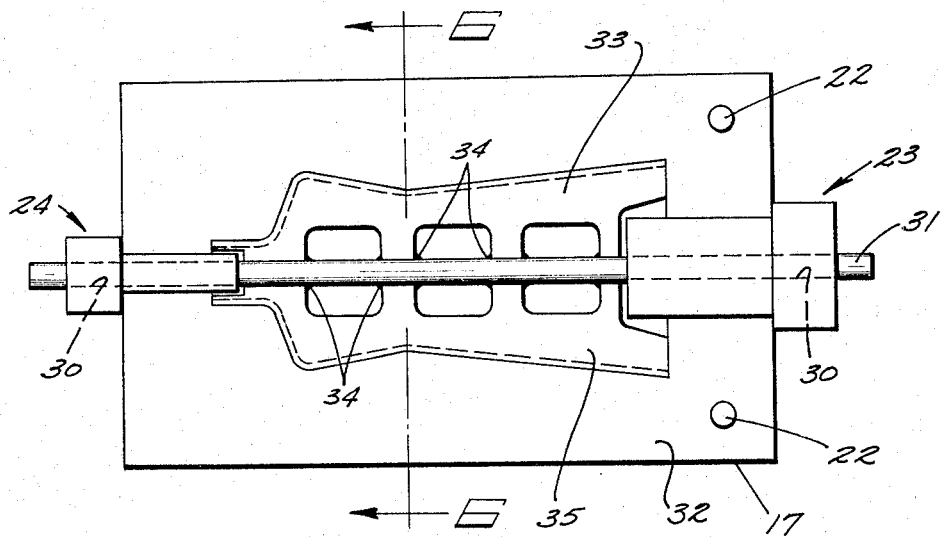
FIG. 5 is a plan view of the epoxy mold with the adaptors assembled therewith and the conductive shim in place.

Referring specifically to the drawings, and in particular to FIG. 1, there is shown a hand-made master 10 which is carved to the shape of the article, in this particular case a bottle, for which it is desired to make electroformed molds. The master may be made of any material that can be carved, such as wood or plastic. This master 10 is actually made from two pieces that are held together along what would normally be the parting line of the mold within which glass is expanded to form the bottle. After the two halves are made, an insert 11 of similar material is placed between the two halves and, in effect, when the three pieces are joined together as a unit, form a master having an enlarged or width adding portion in the middle. The insert 11 is important from the standpoint that after electroforming it is necessary that the resulting electroform be split or cut apart to form the mold halves and the additional width along the parting line represented by the insert 11 permits cutting through this area without fear of cutting into what ultimately will be the faces of the mold halves. However, the purpose of the insert 11 will be more fully developed in the explanation to follow.

The master 10 is also provided with a rod 12 which extends axially through the length of the master and small, inwardly extending, conically tapered recesses 13 are provided in the ends of the rod 12.

The recesses 13, as shown in FIG. 3, in cooperation with a pair of tapered pins 14, serve as locating and supporting bearing surfaces for supporting the master 10 in a mold box 15. The pins 14, as shown, are carried by the mold box side walls in diametrically opposed relationship and when the master 10 is placed between the pins 14, the pins are moved into the recesses 13. The master is thus supported with its central axis (shown in dotted line in FIG. 3) horizontal and the plane defining the parting line is maintained horizontal. With the master supported within the mold box 15, epoxy is poured into the mold box in surrounding relationship with the lower half of the master 10, with the epoxy filling the box to at least the level of the lower tapered surface 16 of the insert 11. When the epoxy has set up the master is removed from the mold box and the female epoxy block 17 is removed from the mold box 15, thus forming a mold cavity 18 within the epoxy block 17. The mold cavity 18 conforms to one-half the shape of the article for which molds are to be made, with the exception that it is somewhat higher as viewed in FIG. 4, due to the slightly outwardly tapered surface 19 which extends about the periphery of the mold cavity and corresponds to the tapered surface 16 of the master.

While the block 17 is disclosed as being formed of an epoxy, it should be kept in mind that any castable material having similar properties could be used equally as well. In actual practice the block 17 is formed by epoxy being poured to the height of the axis of the master 10 and will have a thickness and upper surface shape as shown in FIG. 4 by the dotted line. A portion of the top surface of the epoxy block 17 is cut down in a precision milling operation and rectangular cutouts 20 and 21 are cut into the epoxy at diametrically opposed ends of the epoxy block 17. These cuts are made symmetrical with respect to the center line of the epoxy mold blocks 17 and the axis of the cavity formed therein.

The identical operation is performed in the manner set forth above for forming the complementary epoxy mold from the other half of the master 10 so that there will be two epoxy mold halves, which when placed together, will have a cavity therein conforming precisely to the shape of the master 10, but will be without the full width of the insert 11 from the standpoint that both of the epoxy females 17 will have been surface cut to a small extent as indicated by the phantom line and full line in FIG. 4.

A pair of locating pins 22 are placed in holes drilled in the upper surface of one of the female epoxy mold halves 17, while the other complementary mold half will have corresponding openings within which the locating pins 22 will extend.

A pair of steel adaptors 23 and 24, shown in FIG. 4, have rectangular cross-sectional shapes, with shank portions 25 and 26 which are adapted to seat within the cutouts 20 and 21 respectively. The adaptors also have enlarged, substantially rectangular, heads 27 and 28 which seat flush with the outside vertical end walls of the epoxy mold halves 17 when placed within the complementary cutouts 20 and 21. Both of the adaptors 23 and 24 have central openings 29 and 30 which extend therethrough. These openings will be coaxial when the adaptors are mounted within one of the epoxy female halves 17.

With the steel adaptors 23 and 24 mounted in the cutouts of one of the epoxy female mold halves 17, as shown in FIG. 5, a rod or tube 31 of electrically conductive material is inserted through the openings 29 and 30, with the rod having an outside diameter less than the inside diameter of the openings 29 and 30 so that the rod is loosely supported by the two adaptors with its longitudinal axis extending substantially coincident with the upper surface 32 of the one epoxy female mold half 17.

With the rod 31 thus supported, a piece 33 of relatively thin conductive shim stock, preferably copper, is tack welded to the rod 31 at spaced points 34. The edge of the piece 33 opposite the edge which is tacked to the rod 31 is cut to follow the peripheral contour of the mold cavity 18 with its edge extending into the slightly enlarged area formed by the outwardly tapered upper edge 19 of the cavity 18.

A similar piece 35 of shim stock is tacked to the rod 31 and, in effect, is a mirror image of the piece 33 and extends in the opposite direction to, but coplanar with the piece 33. A one-piece shim may also be used which, in effect, would be a combination of pieces 33 and 35.

Thus it can be seen that the conductive rod 31 and the conductive shim pieces 33 and 35 span the entire width of the cavity 18 formed in the epoxy female mold half 17.

Figure 6:
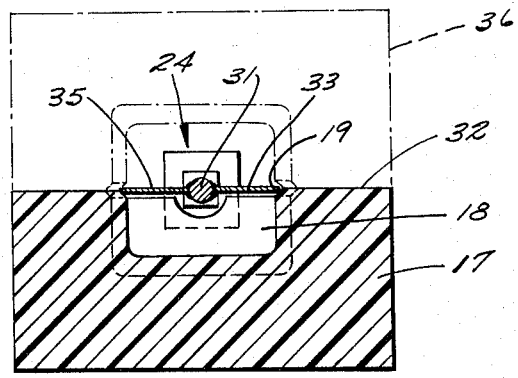
FIG. 6 is a cross-sectional view taken at line 6—6 of FIG. 5.

With the parts arranged as shown in FIGS. 5 and 6, the other female mold half is placed over top of the one which carries the rod 31 and pieces 33 and 35 of shim stock and with the mold halves 17 and 36 held together (as shown in FIG. 7), one of the adaptors, for example adaptor 23, is removed and sufficient epoxy is poured into the cavity 18 to completely fill the cavity and on the reinsertion of the adaptor 23 a slight excess of epoxy will flow out between the rod 31 and the adaptor 23. After the poured epoxy has set up, the two mold halves 17 and 36 are opened and the adaptors removed, exposing the epoxy electroform mandrel 37, shown in FIG. 8. After removal of the mold halves 36 and 37, it will be noted that the resulting epoxy mandrel will have outwardly tapered edges extending along the sides thereof which correspond to the position of the ends of the shim stock pieces 33 and 35.

At this time the excess, tapered, material is ground off substantially flush with the side surface of the mandrel 37, thus exposing the edge of the shim stock at the surface of the mandrel 37 along diametrically opposed sides thereof which correspond generally to the parting line of the two-piece molds which are to be electroformed on the mandrel 37. Also, it should be noted that with the removal of the steel adaptors 23 and 24, accurately located rectangular recesses 38, shown in FIG. 8, are formed at the top and bottom of the mandrel 37.

The steel adaptors 23 and 24 are replaced by a pair of epoxy adaptors 39 and 40, indicated in dotted line on FIG. 8, which are formed with shanks which fit within the recesses 38 formed by the removal of the steel adaptors. It will be noted when viewing FIG. 8 that the epoxy adaptors 39 and 40 have heads which are substantially larger than the heads of the steel adaptors. These enlarged heads will serve the purpose of preventing electro-deposition over the ends of the mandrel 37 during the electroforming process and also prevent excess build-up of electro-deposition at the ends of the mandrel. The shims 33 and 35 provide a conducting path to the surface of the mandrel 37 from the rod 31 and thus it is not necessary to provide conduction across the ends of the mandrel 37. In this manner electroforming is isolated to the area between the adaptor heads 39 and 40.

After the electroforming has been completed, it is only necessary to replace the epoxy adaptors 39 and 40 with a pair of steel adaptors 41 and 42 which have heads which are identical with the previously described steel adaptors or to insert the adaptors 23 and 24. It should be understood that when using the adaptors 23 and 24, that they will be slightly longer than the adaptors 41 and 42. However, the only important thing is that upon reinsertion of the steel adaptors, their heads will accurately define planes that are parallel to the plane containing the shim stock.

Referring now specifically to FIGS. 9-12, the finishing off of the electroformed mold will be described.

With the placing of the two adaptors 41 and 42 in the ends of the mandrel which has been electroformed, the two adaptors are placed on accurately positioned blocks 43 and 44 which are resting on a horizontal bed 45 of a milling machine. With the mandrel thus supported, a slab mill 46, which is located above the electroform, is moved relative to the electroform and will mill the side of the electroform in a plane parallel to the axis of the electroform. The degree of cutting of the slab mill is determined by the setting of the slab mill in relation to the surfaces of the adaptors 41 and 42. This distance is predetermined and known prior to the operation of the slab mill. The two sides of the electroform which are parallel to the plane of the split lines of the finished mold are milled in the same manner so that the outside of the electroform will be accurately machined in two parallel planes on the back thereof. After the electroform has been squared off, it is placed in a lathe having a chuck 47 and arbor 48 which orient the axis of the electroform in a horizontal plane and permit turning of the electroform so as to remove a portion of the electroform at either ends thereof, as indicated in dotted line on FIG. 10. After the electroform has been machined to its approximate overall length, the electroform is clamped on a mill table 49 by an overhead clamp 50. With the electroform clamped to the mill table 49, a milling machine having a rotating head 51 is used to cut through the electroform into the epoxy mandrel along the expected parting line of the mold which is being made. This operation is greatly facilitated by the fact that the exact position of the cut can be accurately determined by measuring from the upper surface of the adaptor. The steel adaptors provide orienting surfaces so that all milling and machining of the electroform may be accomplished with accuracy and precision relative to the mandrel contained therein. Upon completion of this cut along both sides of the electroform, both halves of the electroform are placed on the support 45 of the milling machine and the slab mill head 46 is moved across the faces of the electroform mold halves to cut off any excess on the mold face, as indicated in dotted line on FIG. 12. Further precise machining of the length of the mold halves will then be performed to complete the machining of the molds. After machining of both mold halves is completed, the molds are ready for mounting in suitable mold holders of the conventional glass forming machine.

It should be clear that with the cutting of the electroform, the mating faces of the resultant mold halves, after machining, will, when placed together, form a cavity that has the side wall configuration of bottles or other articles which are formed by expansion of a parison or preform therein.

Thus it can be seen that the mandrel, shown in FIG. 8, which serves as the electroforming mandrel, is provided with a conducting path from the rod 31 to the surface of the mandrel which actually passes through the mandrel rather than around the ends, as is the present practice.

With the particular arrangement disclosed, the mandrel may be isolated from any electroplating or electroforming at the ends, thus permitting the retention of the recesses 38. These recesses are necessary for determining with accuracy and precision where later machining and cutting of the electroform into halves are to be made.

Obviously the female epoxy molds may be used to make a plurality of mandrels before they are scrapped.

In the present practice it is usually necessary to make an educated guess as to where the parting line falls and to cut the electroform in this area with the hope that the cut will be made in the area where there is excess material. The electroforming process, while providing an external surface which generally conforms to the shape of the mandrel, frequently plates so that the seamline appears skewed and renders it difficult, if not impossible, to accurately ascertain where the splitting of the electroform should be made.

However, with applicant's mandrel the location of the cut and the location of the planes for machining the backs of the electroform is precisely given by the insertion of the steel adaptors 41 and 42 which have precise location with respect to the orientation of the mandrel 37 and have faces which are parallel or perpendicular to the split line of the two mold halves which are to be made.

Other and further modifications may be resorted to without departing from the spirit and scope of the appended claims.

I claim:

1. In the method of electroforming a split, glass forming mold from a master having the external shape of the articles to be formed in the mold but with added material coincident with the parting line making the master wider than the mold cavity of the glass forming mold, the steps including making a pair of matching female epoxy mold halves from the master with precisely formed slots in the ends thereof, placing a conductive member along the axis of one of said female epoxy mold halves, placing a conductive sheet having a contour similar to the diametrical cavity contour over the cavity opening, connecting the sheet to the conductive member, placing the other epoxy mold half over the one mold half thereby forming a cavity, forming a mandrel within the cavity of the female epoxy mold, removing the mandrel from the mold, exposing the edge of the sheet at the surface of the mandrel, and placing non-conducting disks over the conducting member with the disks abutting the ends of the mandrel.

2. In the method of electroforming a split, glass forming mold from a master having the external shape of the articles to be formed in the mold but with added material coincident with the parting line making the master wider than the glass articles to be produced, the step including making a pair of matching female epoxy mold halves from the master with precisely formed slots in the ends thereof, placing a conductive member along the axis of one of said female epoxy mold halves, placing a pair of conductive sheets having a contour similar to the radial contour of the cavity over the cavity at opposite sides thereof, connecting the sheets to the conductive member, placing the other epoxy mold half over the one mold half thereby forming a cavity, forming an epoxy mandrel within the female epoxy mold, removing the mandrel from the mold, exposing the edges of the sheets at the surface of the mandrel, and placing non-conducting disks over the conducting member with the disks abutting the ends of the epoxy mandrel.

3. In the method of electroforming a split glass forming mold comprising the steps of making a master having the shape of the final ware with the exception of an enlarged, width adding portion at the parting line, molding two female epoxy mold halves about the master, machining an opening in both ends of the epoxy molds symmetrical with the centerline of the molds, making a pair of adaptors having axial passages therethrough to fit within said openings, placing a conductive rod through said adaptors, while the adaptors are resting in one of the female mold halves, connecting to said conductive rod a conductive sheet having its periphery substantially the same shape as the epoxy mold opening, placing the other mold half in closing relationship with respect to the one mold half, removing one of the adaptors, pouring epoxy into the interior of said molds to fill the mold, replacing the one adaptor, removing the mold halves after the epoxy has hardened, exposing the edge of the conductive sheet at the mandrel surface and replacing both adaptors with insulators of non-conductive material having portions which fit within the openings left by the adaptors and fit flush with the ends of the mandrel whereby a mandrel for electroforming molds is produced.

4. In the method of electroforming a split glass forming mold comprising the steps of making a master having the shape of the final ware with the exception of an enlarged, width adding portion at the parting line, molding two female epoxy mold halves about the master, machining an opening in both ends of the epoxy molds symmetrical with the centerline of the molds, making a pair of adaptors having axial passages therethrough to fit within said openings, placing a conductive rod through said adaptors, while the adaptors are resting in one of the female mold halves, connecting a conductive sheet, having its periphery substantially the same shape as the epoxy mold opening, to said conductive rod, placing the other mold half in closing relationship with respect to the one mold half, removing one of the adaptors, pouring epoxy into the cavity of said mold to fill the mold, replacing the one adaptor, removing the mold halves after the epoxy has hardened, grinding off the outstanding, peripheral sides of the resultant mandrel to expose the edge of the conductive plate and replacing both adaptors with plates of non-conductive material having portions which fit within the openings left by the adaptors and fit flush with the ends of the mandrel whereby a mandrel for electroforming molds is produced.

5. In the method of making an electroform mandrel for a two-piece mold comprising the steps of making a master having the wall shape of the final ware with the exception of an enlarged, width adding portion at the parting line, molding two complementary female epoxy mold halves about the master, machining a channel in both ends of the epoxy molds symmetrical with the centerline of the molds, placing a pair of close fitting members having axial passages therethrough within the channels in one of said epoxy mold halves, placing a conductive rod through the passages in said members, placing a sheet of conductive material between the conductive rod and slightly beyond the outer edge of the mold cavity, connecting said sheet to said conductive rod, closing the other epoxy mold half over the half containing the conductive sheet, removing one of the members, pouring epoxy into and substantially filling the cavity formed by the mold halves, replacing the one member, separating the mold halves, grinding off the sides of the resultant mandrel to expose the edge of the conductive sheet and replacing the adaptors with plates of non-conductive material having portions which fit within the opening left by the adaptors, whereby an electroforming mandrel is formed.

6. The method of making an electroform mandrel for a split mold for glassware comprising the steps of making a master having the shape of the final ware with the exception of an enlarged, width adding portion at the parting line, molding two female epoxy mold halves about the master, machining an opening in both ends of the epoxy molds symmetrical with the centerline of the molds, making a pair of adaptors having axial passages therethrough to fit within said openings, placing a conductive rod through said adaptors, while the adaptors are resting in one of the female mold halves, placing a conductive sheet over the opening in said mold with the periphery of the sheet conforming to the contour of the mold opening, connecting said sheet to said conductive rod, placing the other mold half in closing relationship with respect to the one mold half, removing one of the adaptors, pouring epoxy into the cavity formed by the mold halves to substantially fill the cavity, replace the other adaptor, remove the mandrel from the mold halves after the epoxy has set up, remove the edges of the resultant mandrel to expose the edge of the conductive sheet and replace the adaptors with plates of non-conductive material having portions which fit within the openings left by the adaptors.

7. The method of electroforming a split glass forming mold comprising the steps of forming a master having the body shape of the glassware to be produced but with an enlarged area coincident with the parting line which makes the master wider than the glassware to be produced, forming a pair of female epoxy molds from the master, placing a pair of adaptors in precisely machined openings in the ends of one of said female epoxy molds supporting a conductive tube coaxial with the parting line of said one female epoxy mold, connecting a conductive plate, having a contour similar to the mold contour at the parting line to the conductive tube, closing the other epoxy mold half over the one mold half, molding an epoxy mandrel within the epoxy female molds, removing the mandrel from the molds, exposing the edge of the plate at the surface of the mandrel, replacing the adaptors with non-conducting disks having portions thereof which fit in the adaptor openings in the ends of the mandrel, electroforming a metal shell about said mandrel, replacing the non-conductive disks with accurately machined adaptors having predetermined shapes, forming flats on the electroformed body parallel to the parting line and splitting the shell from the mandrel along the line of the plate, and finishing the resultant mold halves.

8. A mandrel for use in electroforming split molds comprising, a plastic member having the external shape of the mold to be formed, said member being slightly wider than the split mold whose cavity it is to form, a conductive member extending axially through said plastic member, a conductive sheet connected to said conductive member and extending through and to the surface of the plastice member to expose the edges of said conductive sheet.

9. A mandrel for use in electroforming split molds comprising, an epoxy member having the external shape of the mold to be formed, said member being slightly wider than the split mold whose cavity it is to form, a conductive member extending axially through said epoxy member, a conductive sheet connected to said conductive member and extending diametrically through said member with its outer edges exposed at the surface of the epoxy member.

10. A mandrel for use in electroforming a two-piece hollow mold comprising, an epoxy member having the external shape of the mold cavity to be formed, said member being slightly wider in the area which is to form the parting line of the mold which is to be produced, a conductive member extending axially through said member, a conductive surface and exposed and extending along the parting line of said epoxy member, and conductive means extending through said epoxy member and connecting said conductive surface area to said conductive member.

11. A mandrel for use in electroforming a two-piece hollow mold comprising, an epoxy member having the exact external shape of the mold cavity to be formed with the exception that said member has added width at the parting line of the two-piece mold to be formed, a conductive member extending axially through said member, conductive means connected to said conductive member and extending to the surface of the epoxy member in the parting line defining area of the member to expose the edges of said conductive means and means insertable over the extending ends of said conducting members for isolating the ends of said conductive members to prevent electroplating thereon.

12. A mandrel for use in electroforming a two-piece hollow mold comprising, an epoxy member having the exact external shape of the mold cavity to be formed with the exception that said member has added width at the parting line of the two-piece mold to be formed, a conductive member extending axially through said member, conductive means connected to said conductive member and extending to the surface of the epoxy member in the parting line defining area of the member to expose the edges of said conductive means and non-conductive means surrounding the extending ends of said conducting members for isolating the ends of said conductive members to prevent electroplating thereon.

13. A mandrel for use in electroforming split molds comprising, an epoxy member having the external shape of the mold to be formed, said member being slightly wider along the split line than the split mold whose cavity it is to form, a conductive member extending axially through said epoxy member, a conductive sheet connected to said conductive member and extending through the epoxy member to the surface of the epoxy member with its exposed outer edges corresponding to the split line of the mold to be formed and means for isolating the ends of said conductive member to prevent electroplating thereon.

No references cited.

JOHN H. MACK, *Primary Examiner.*

W. VANSISE, *Assistant Examiner.*